June 8, 1965 P. E. DOUBLE 3,187,427
METHOD OF INSTALLING A CLINCH NUT
Original Filed June 25, 1962 2 Sheets-Sheet 1
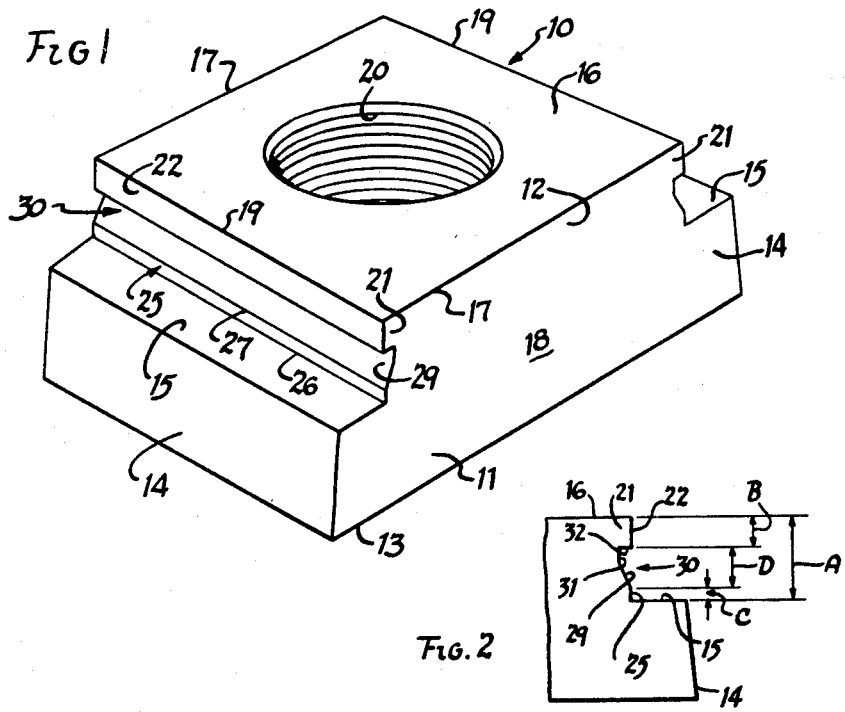
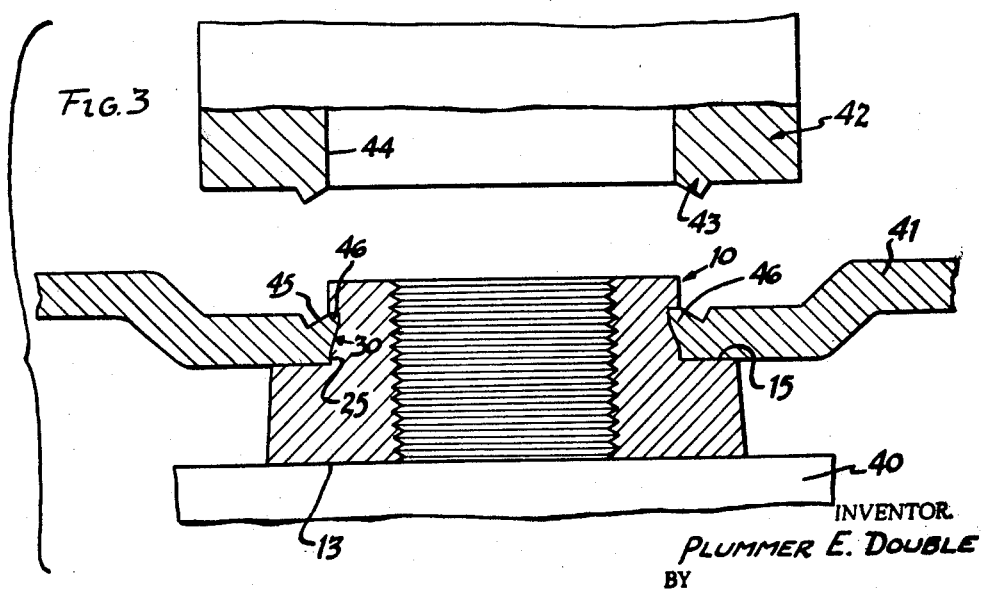
INVENTOR.
PLUMMER E. DOUBLE
BY
ATTORNEYS June 8, 1965 P. E. DOUBLE 3,187,427
METHOD OF INSTALLING A CLINCH NUT
Original Filed June 25, 1962 2 Sheets-Sheet 2
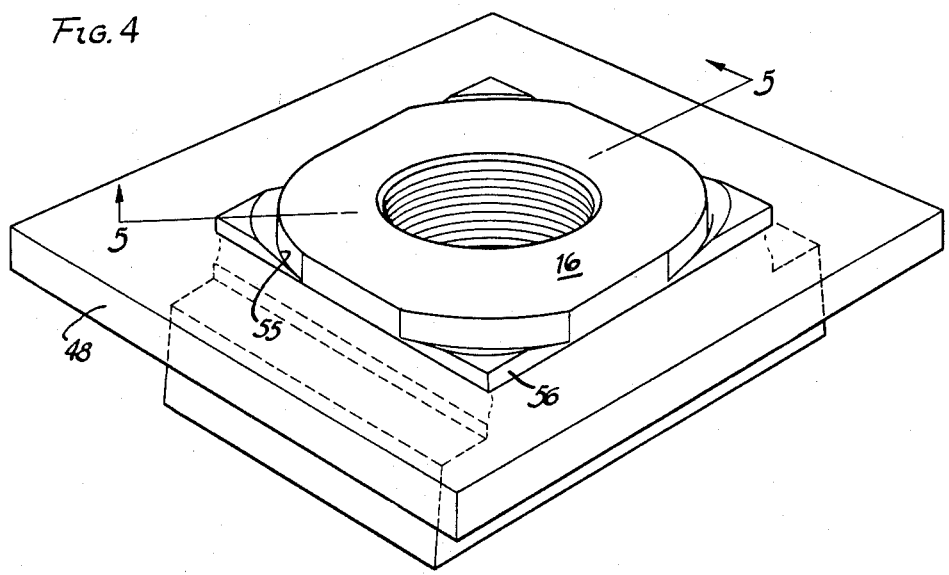
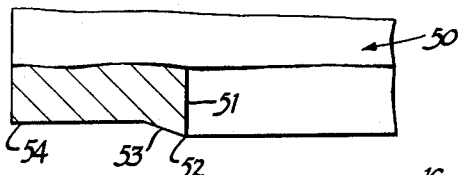
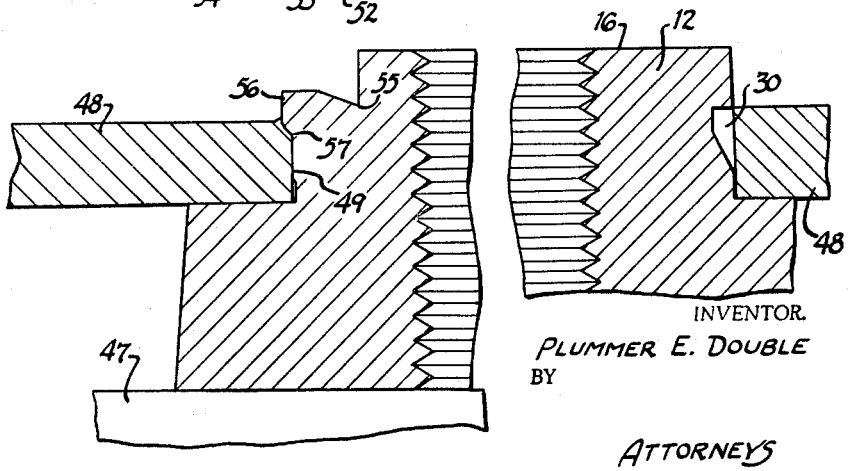
INVENTOR.
PLUMMER E. DOUBLE
BY
ATTORNEYS 3,187,427
METHOD OF INSTALLING A CLINCH NUT
Plummer E. Double, Detroit, Mich., assignor to Multifastener Corporation, Redford, Mich., a corporation of Michigan
Original application June 25, 1962, Ser. No. 204,854. Divided and this application May 31, 1963, Ser. No. 284,562
2 Claims. (Cl. 29—509)

This application is a division of my copending earlier filed United States application Serial No. 204,854, filed June 25, 1962.

The present invention relates to a method of affixing a nut capable of serving as either a pierce nut or clinch nut to a panel by either a piercing or clinching operation by deforming the panel or the nut, respectively.

In the manufacture of products, such as appliances, automobiles, and the like, from sheet metal panels, it is often necessary to attach adjacent panels to one another or to attach brackets or the like to a panel. To accommodate the utilization of bolts and other threaded fasteners to such assembly operations, there have been developed various means for securing a nut to a panel. Two general types of nuts are utilized for this purpose. One such type of nut is a "clinch nut" of the type illustrated in Patent No. 2,183,641. To utilize such a nut, an aperture is formed in the panel, the nut is positioned against the panel with a pilot portion of the nut projecting through the aperture, and the pilot portion is staked outwardly so that the peripheral portions of the nut overhang the aperture in the plate. A second form of nut, commonly known as a "pierce nut," is illustrated in Patent No. 2,707,322. Here, the nut serves as the punch and is forced through the panel or plate to form its own hole. The nut is provided with undercut grooves into which the panel is deformed by a die operation to secure the nut to the panel or plate.

While these two types of nuts are interchangeable in use, i.e. to provide for securing a bolt or other threaded fastener to the panel by means of the nut, conventional clinch nuts and pierce nuts are not interchangeable in the sense that the same nuts can be used for either function. The clinch nut does not have an undercut groove into which the metal can be deformed or swaged, while the pierce nut does not fit within a pre-pierced hole so as to be accurately clinched in position, due to the undercut grooves therein.

Obviously, substantial advantages could be obtained by utilizing a single nut structure capable of functioning as either a clinch nut or a pierce nut, depending upon the specific application, the manner of installation, and other process or product variables.

The method of the present invention provides such a single nut capable of interchangeable utility as either a clinch nut or a pierce nut. This dual function is obtained by merely utilizing a pierce nut having undercut grooves of a specific configuration and serving to firmly locate the pilot portion of the nut in a preformed hole to retain the nut in position for a subsequent staking operation. At the same time, the undercut grooves of the pierce nut are capable of receiving therein portions of the panel swaged thereinto by utilization of a conventional swaging die.

The particular groove configuration, as applied to a specific nut configuration, is located between a massive piercing shoulder formed on the pilot portion of the nut and the laterally projecting shoulders extending beyond the pilot portion and serving to bottom the nut on the panel to which it is to be affixed. Immediately adjacent each of the flanges there is located a pilot base ledge coextensive with the nut flange and coplanar with the piercing shoulder. Between this ledge and the shoulder is located the undercut groove.

In utilizing the nut, it is obvious that the pre-pierced hole must be capable of accommodating passage of the nut pilot portion thereinto, the ledge then also enters the hole and serves to center the nut in the hole for a subsequent staking operation. Similarly, when the nut is utilized as a pierce nut, the aperture which is pierced in the panel is of substantially the same dimension as the pilot portion shoulder, so that the ledge again will snugly fit within the punched aperture.

When the nut is utilized as a clinch nut, the staking operation occurs at the corners of the nut shoulder, the nut metal being deformed outwardly to overlie the edges of the panel aperture. In utilizing a nut of the present invention, the staking operation is carried out to such an extent that nut metal flows into the nut grooves and forms a tight interconnection between the nut and the edges of the panel aperture. Thus, the staking operation performed upon the clinch nut serves to fill or close up the pierce nut grooves at the regions of staking and an extremely tight nut-panel fit is obtained.

When the nut is utilized as a pierce nut, the locating ledge at the extremity of the groove serves to fill the lower portions of the groove, which are the most difficult portions normally to fill with material swaged from the sheet metal panel. Also, the ledge aids in directing the swaged panel metal into the groove so that the groove is completely filled with swaged metal, thus resulting in improved pierce nut-panel assembly.

It is, therefore, an important object of the method of the present invention to provide an improved nut capable of being utilized as either a pierce nut or a clinch nut.

Another important object of the method of this invention is the provision of a nut provided with undercut grooves of specific configuration and adapting the nut for utility as either a pierce nut or a clinch nut, the groove configuration aiding in locating the adjacent nut pilot portion in a pre-pierced hole (when the nut is utilized as a clinch nut) and aiding to fill the grooves with swaged metal from the panel (when the nut is utilized as a pierce nut).

It is a further important object of this invention to provide an improved method of securing a nut in a pre-pierced hole in a sheet metal panel, the nut having a pilot portion projecting through the pre-pierced hole and a groove positioned in the hole, the nut pilot portion being subsequently deformed to effect metal flow over the edges of the hole and to fill the nut grooves at those locations of the nut at which it is deformed.

It is an additional, and no less important, object of the method of this invention to provide a novel nut having laterally extending shoulders and a reduced polygonal pilot portion joined to the shoulders through side walls provided with undercut grooves, the side walls having a ledge surface adjacent the shoulders and coplanar with the pilot portion, the ledges serving to locate the nut pilot portion in the panel aperture when the nut is utilized as a clinch nut and serving to direct the flow of swaged metal into the grooves when the nut is utilized as a pierce nut.

Other objects of this invention will appear in the following description and appended claims, reference being had to the accompanying drawings forming a part of this specification wherein like reference characters designate corresponding parts in the several views.

On the drawings:

FIGURE 1 is a perspective view illustrating a nut of the present invention;

FIGURE 2 is a fragmentary enlarged sectional view further illustrating the nut and particularly the groove thereof;

FIGURE 3 is a sectional view illustrating utilization of the nut as a pierce nut;

FIGURE 4 is a perspective view illustrating utilization of the nut as a clinch nut; and FIGURE 5 is a sectional view similar to FIGURE 3 illustrating the clinching of the nut into position.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIGURE 1, reference numeral 10 refers generally to a nut of the present invention. This nut 10 is a rolled shape and is made in continuous strip form, the individual nuts 10 being severed from such a strip and simultaneously punched to form a blank aperture, this aperture later being tapped by conventional tapping methods.

It will be noted that the nut 10 is polygonal in shape, preferably rectangular and has a massive body 11 from which a reduced upper pilot portion 12 projects. The massive body 11 includes, in the orientation of FIGURE 1, a planar bottom surface 13 and a pair of laterally projecting flanges 14 having upper stop surfaces 15 which normally abut one surface of the panel to which the nut is affixed, as will be hereafter more fully described.

The upper surface 16 of the nut is also planar and is provided with perimetric or peripheral shearing edges 17 extending along the planar side surfaces 18 of the nut and additional shearing edges 19 overlying those edges of the nut provided with the flanges 14. The nut pilot portion 12 and the nut body portion 11 both encompass a centrally located threaded aperture 20 adapted for the reception of a bolt or similar threaded fastener.

The piercing edges 19 are contiguous with and form one edge of nut shoulders 21. These shoulders 21 are of substantial size in order to withstand the punching force exerted by the nut when it is utilized as a pierce nut. These flanges 21 have exposed rectangular side surfaces 22 which lie parallel to the axis of the aperture 20.

One novel feature of the present invention resides in a ledge or pilot surface 25 which is coplanar with the side surfaces 22 of the shoulders 21 of the pilot portion 12 of the nut. This ledge surface is defined by one edge 26, common to the shoulder surface 15 and the ledge surface 25, and by an upper edge 27 located between the flange surface 15 and shoulder 21. As best illustrated in FIGURE 2 of the drawings, the surface 25 is coplanar with the edge surface 22 of the shoulder 21 for a purpose to be hereinafter more fully described.

The edge 27 defining that extremity of the surface 25 spaced from the flange surface 15 is common to the surface 25 and to an inclined surface 29. This surface 29 is inclined toward the overlying shoulder 21 and toward the axis of the threaded aperture 20 to define with the overhanging shoulder a groove indicated generally at 30. The surface 29 terminates in a flat surface 31 lying generally parallel to the surfaces 25 and 22 and joined to the surface 22 by means of a planar undersurface 32 parallel to the exposed surface 16 of the nut pilot portion 12.

Also, as illustrated in FIGURE 2 of the drawings, there is illustrated the dimensional relationship between the surfaces 22 and 25 and the groove 30. The dimension denoted A is defined as the "pilot height" of the nut, i.e. the distance between the piercing face 16 of the nut and the stop surface 15. The dimension denoted B is the "shoulder height" of the nut and constitutes from ⅓ to ½ of the pilot height A. The dimension C is the "pilot base" or "ledge" height and is not less than 0.010 inch. The dimension D is the "groove height" of the nut and is from ½ to ⅔ of the pilot height less 0.010 inch or the ledge height, whichever is greater.

Of these dimensions, the shoulder height is of extreme importance inasmuch as this shoulder serves as the punch when the nut is utilized as a pierce nut and the shoulder must be sufficiently heavy to accommodate punching through the sheet metal without such deformation of the nut as would interfere with the groove 30 or with the threaded aperture 20. The pilot base C is of such height as to serve to accurately position the nut within a pre-pierced hole when the nut is utilized as a clinch nut. The groove height "D" is sufficient to accommodate the flow of sufficient metal into the groove beneath the shoulders 21 to firmly affix the nut to the plate when the nut is utilized as a pierce nut.

In that embodiment of the invention illustrated in FIGURE 3 of the drawings, it will be seen that the nut 10 is firmly grounded or supported upon a base 40 contacting the undersurface 13 of the nut. The plate 41 is intially interposed between the nut 10 and a die button 42 having a swaging projection 43 surrounding a slug aperture 44 in the die. Upon relative movement of the die button 42 of the nut 10, the nut pilot portion is forced through the plate 41, thus piercing an aperture for the pilot portion. Subsequent further contact between the die button and the plate indents the plate, as at 45, as the plate is bottomed upon the stop surfaces 15 of the nut and the plate is swaged, as at 46 into the grooves 30. It will be seen that the ledge 25 prevents any substantial lateral flow of metal immediately adjacent the bottom of the aperture formed in the plate, and that this ledge serves to aid in directing metal 46 into the groove 30.

In that embodiment of the invention illustrated in FIGURES 4 and 5, the nut 10 is utilized as a clinch nut. As best illustrated in FIGURE 5 of the drawings, the nut is firmly bottomed against a base or the like 47 and a plate 48 having therein a pre-pierced hole 49 is then telescoped over the pilot portion 12 of the nut. This pre-pierced hole 49 is of the same shape as the nut pilot portion and is of the same transverse dimension with a clearance of 0.010 inch in each lateral dimension. This hole is kept to a tolerance of 0 on the low side and of 0.003 inch on the high side to accommodate wear in the punch forming the aperture 49 in the plate 48. With the plate and the nut pre-assembled, the nut is next contacted with a staking die 50 having a central circular aperture 51 of a diameter somewhat greater than the transverse diameter of the nut and having a circular cutting edge 52 forming the apex of a frusto-conical staking surface 53 terminating in a laterally outwardly extending stop flange 54.

It will be noted from FIGURE 4 that the staking edge 52 contacts the nut pilot surface 16 only adjacent the corners thereof and that the staking die 50 is displaced to an extent sufficient to indent the nut pilot corners to an appreciable extent, as at 55. The inclined frusto-conical surface 53 displaces the nut metal laterally outwardly relative to the nut to displace the corners of the nut outwardly, as at 56, to overlie the corners of the aperture 49. Additionally, nut metal is displaced, as at 57, to fill the grooves 30 at the corners and to firmly establish lateral contact between the nut and the edges 49 of the plate aperture.

Thus, it will be appreciated that the present invention provides a new and novel method of staking a dual purpose pierce-clinch nut within a pre-pierced hole in a panel or the like. Due to the presence of the pilot base or ledge surface 25, the nut is firmly piloted into the aperture 49, and this ledge prevents "drifting" of the nut toward one side or the other of the aperture. Thus, the main disadvantage of conventional pierce nuts is avoided.

Further, by staking only the corners of the nut, a sufficient force can be exerted upon the nut pilot portion by the staking edge 52 to substantially completely fill the nut groove 30 therebeneath and to establish firm nut-panel contact.

I claim:
1. In a method of installing a clinch nut in a panel having a polygonal aperture, the nut having a polygonal end pilot portion projecting through the panel aperture, flanges bottomed against the panel, grooves located in the panel aperture and a pilot base portion snugly fitting into said aperture, the flanges and grooves being on opposite sides of said pilot portion and said pilot base portion being between each of said grooves and the adjacent flange, the steps of inserting said end pilot portion into said preformed aperture to an extent such that said end pilot portion projects beyond one face of the panel and said flanges abut the other face of the panel, centering said nut in said aperture by the snug fit of the pilot base portion in said aperture, laterally outwardly deforming the corners only of the nut end pilot portion to overlie the plate adjacent said aperture and to affix the nut to the panel, and displacing the so-deformed nut corners toward the nut flanges to flow a portion of each such nut corner into the corresponding nut groove only at said corners and between the nut pilot base portion and the pilot portion, said displaced nut corners and said pilot base portion effecting snug abutment between said nut and the edges of the panel aperture at each corner thereof.

2. The method of installing a clinch nut in a panel having a preformed polygonal aperture, the nut having a polygonal end pilot portion of substantially the size and shape of the panel aperture, a pair of flanges spaced from the end pilot portion through a distance at least as great as the thickness of the panel, grooves immediately adjacent the end pilot portion, said flanges and said grooves being on opposite sides of said end pilot portion, and a pilot base portion of substantially the same shape and size as the end pilot portion and interposed between each of said grooves and the adjacent flange, respectively, the steps of inserting said nut pilot portion into said aperture to an extent such that said end pilot portion projects beyond one face of said panel and said flanges abut the other face of said panel, centering said nut in said aperture despite the presence of said grooves within said aperture by the snug fit therein of said pilot base portion, laterally outwardly deforming each of the corners only of the end nut pilot portion to overlie the plate adjacent said aperture and to affix the nut to the panel, and displacing the so-deformed nut corners toward the nut flanges to force a portion of each nut corner into the corresponding nut groove only at said corners and only between said end pilot portion and said pilot base portion, and to effect snug abutment between said nut and the edges of the panel aperture adjacent thereto.

References Cited by the Examiner

UNITED STATES PATENTS

| | | |
|---|---|---|
| 2,110,039 | 3/38 | Double. |
| 2,707,322 | 5/55 | Strain et al. _____ 29—432 |
| 2,749,606 | 6/56 | Donahue _____ 29—432 |
| 2,750,660 | 6/56 | Newcomb _____ 29—432 |
| 2,784,930 | 3/57 | Wernecke _____ 29—432 X |
| 3,091,843 | 6/63 | Double et al. _____ 29—432 |

WHITMORE A. WILTZ, *Primary Examiner.*

JOHN F. CAMPBELL, *Examiner.*